US006323171B1

(12) United States Patent
Fonsny et al.

(10) Patent No.: US 6,323,171 B1
(45) Date of Patent: Nov. 27, 2001

(54) ANTIMICROBIAL MULTI PURPOSE MICROEMULSION CONTAINING A CATIONIC SURFACTANT

(75) Inventors: Pierre Fonsny, St Ives (AU); Julie Burke, Somerset, NJ (US); Didier Dormal, Grivegnee (BE)

(73) Assignee: Colgate-Palmolive Co, Piscataway, NJ (US)

( * ) Notice: Subject to any disclaimer, the term of this patent is extended or adjusted under 35 U.S.C. 154(b) by 0 days.

(21) Appl. No.: 09/479,346

(22) Filed: Jan. 7, 2000

Related U.S. Application Data

(63) Continuation-in-part of application No. 09/109,690, filed on Jul. 2, 1998, now abandoned, which is a continuation-in-part of application No. 08/989,344, filed on Dec. 12, 1997, now Pat. No. 5,911,915.

(51) Int. Cl.[7] .......................... A01N 25/02; B01F 17/42; C11D 1/835; C11D 3/48

(52) U.S. Cl. .......................... 510/384; 424/405; 510/365; 510/417; 510/488; 510/504; 516/67; 516/69

(58) Field of Search ................................ 516/59, 62, 67, 516/69; 510/365, 384, 417, 488, 504; 424/405

(56) References Cited

U.S. PATENT DOCUMENTS

| | | | | |
|---|---|---|---|---|
| 3,849,348 | * | 11/1974 | Hewitt | 510/504 X |
| 4,272,395 | * | 6/1981 | Wright | 510/384 |
| 4,810,409 | * | 3/1989 | Harrison et al. | 510/488 X |
| 5,008,030 | * | 4/1991 | Cook et al. | 510/384 |
| 5,454,984 | * | 10/1995 | Graubart et al. | 510/384 |
| 5,486,307 | * | 1/1996 | Misselyn et al. | 510/365 |
| 5,523,013 | * | 6/1996 | Durbut et al. | 510/365 X |
| 5,549,840 | * | 8/1996 | Mondin et al. | 510/365 |
| 5,591,708 | * | 1/1997 | Richter | 510/384 X |
| 5,656,585 | * | 8/1997 | Grandmaire et al. | 510/524 |
| 5,691,289 | * | 11/1997 | Purcell et al. | 510/417 X |
| 5,911,915 | * | 6/1999 | Fonsny et al. | 510/365 X |
| 6,121,224 | * | 9/2000 | Fonsny et al. | 516/69 X |

* cited by examiner

*Primary Examiner*—Richard D. Lovering
(74) *Attorney, Agent, or Firm*—Richard E. Nanfeldt

(57) ABSTRACT

An improvement is described in microemulsion compositions which are especially effective in disinfecting the surface being cleaned and in the removal of oily and greasy soil without leaving streaks which contains a mixture of at least one nonionic surfactant, a cationic surfactant and an amphoteric surfactant, a hydrocarbon ingredient, natural disinfectant ingredients, a water soluble solvent, a pH buffer and water.

8 Claims, No Drawings

ANTIMICROBIAL MULTI PURPOSE MICROEMULSION CONTAINING A CATIONIC SURFACTANT

RELATED APPLICATION

This application is a continuation-in-part of U.S. Ser. No. 9/109,690 filed Jul. 2, 1998, now abandoned, which in turn is a continuation-in-part of U.S. Ser. No. 8/989,344 filed Dec. 12, 1997 and now U.S. Pat. No. 5,911,915.

FIELD OF THE INVENTION

This invention relates to an improved multi purpose liquid cleaner in a microemulsion form, to be used neat, in particular for cleaning and disinfecting hard surfaces and which is effective in sanitizing surfaces, in removing grease soil and also dries fast leaving the surfaces streak free.

BACKGROUND OF THE INVENTION

Disinfectant composition based on cationic and nonionic are well known. However, these compositions while very efficient in disinfecting surfaces, generally do not remove grease and oil as desired; hence, leaving residues and streaks on surfaces. Addition of an efficient anionic surfactant cleaner, to the cationic surfactant, either creates instability problems or deactivates the disinfectant behavior of the cationic. Anionic and nonionic mixtures have a good grease removal properties, but do not perform at all to sanitize the surface being cleaned.

SUMMARY OF THE INVENTION

The instant compositions exhibit good grease removal properties combined with excellent disinfecting properties and the compositions do not leave streak or residue on the surface being cleaned.

The described compositions are to be used mainly neat in a spray form. The compositions contain a lower level of surfactant than current all purpose cleaning compositions and have a richer level of solvent than surfactant. In order to have a product which leaves the surfaces shiny after cleaning, the instant compositions are builder free.

The instant compositions teach that combination of amine oxide nonionic surfactant, at least one fatty alcohol nonionic surfactant and cationic surfactant have better grease removal properties while maintaining the disinfecting efficacy. This improvement is linked to the fact that the instant compositions are microemulsion.

One particular grade of amine oxide (Tomah's AO14-2) has been found to reduce streaks induced by nonionic surfactant. Amine oxide nonionic surfactants are however expensive and have to be free of nitrosamine to allow their usage.

A more cost effective way than using amine oxide surfactant has been to use an amphoteric surfactant in combination with a fatty alcohol nonionic surfactant and with a cationic. Alkylaminocarboxylate surfactant at pH 7 to 10 will exhibit a behavior similar to a composition of anionic surfactant, in combination with nonionic surfactant which have an excellent grease removal efficacy. The amphoteric surfactant will not react with the cationic surfactant and some amphoteric surfactants have even demonstrated a disinfecting action which becomes cumulative with the cationic bactericidal effect. Some amphoteric are known to alter the bacteria cell membrane and allow a better efficacy of the bactericide.

Cationic surfactants have demonstrated different grease removal efficacy depending on their structure. Alkyl dimethyl benzyl quaternary ammonium exhibits good grease and fat removal but will leave residue on surfaces. Di-alkyl dimethyl quaternary ammonium, while still having good grease removal efficiency, have been found to significantly reduce the residues and streaks when used in combination with a fatty alcohol nonionic and an amphoteric surfactant.

A safe solvent system used in the instant compositions which has been found effective are glycol ethers such as propylene glycol butyl ether (PNB) alone or in combination with ethanol. PNB brings a significant benefit in degreasing performance and also promotes a fast drying out of the surface which has been cleaned. Oily material such as essential oil or perfume, when added to a composition, usually increase the streaks on surfaces.

The combination of a glycol ether with the surfactant system of the present invention allows a faster water film dry out time than obtained with current commercial spray formulations. It is important to select the perfume such as an essential oil not only to satisfy the cosmetic and the marketing needs, but also to have a minimum of residue left on the surface being cleaned. The selection of essential oils is also important because not only they will communicate the efficacy of the product to the consumer but also because they are effective bactericide.

In one aspect, the invention generally provides a stable, clear multi purpose, microemulsion hard surface cleaning composition especially effective in disinfecting the surface being cleaned and in the removal of oily and greasy oil while a fast dry out time and without leaving streaks on the surface being cleaned. The microemulsion compositions include approximately, on a weight basis:

from 0.1% to 20% of at least nonionic surfactant;

from 0.1% to 20% of at least one disinfecting agent such as cationic surfactant such as dimethyl dialkyl ammonium chloride such as the Bardac 2170 or 2180 or Barduc 22 and/or a mixture of dialkyl dimethyl ammonium chloride and an alkyl benzyl ammonium chloride such as Barquat MB-50 (Lonza) or Protectol KLC-50 (BASF);

from 0.1% to 20% of at least amphoteric surfactant;

0.1% to 8% of at least a water soluble solvent;

0.1% to 3.0%, more preferably 0.2% to 2% of a perfume, water insoluble organic compound or essential oil; and the balance being water, wherein the composition is not a liquid crystal and the composition has a storage modulus at 25° C. less than 0.2 Pascal when measured at a frequency of ten radian per second and a strain of 0.01% and the composition does not contain an anionic surfactant containing sulfonate, sulfate or carboxylate groups and the composition also does not contain a pyrrolidone compound such as N-methyl pyrrolidone and the composition also does not contain a grease release agent such as an ethoxylated maleic anhydride-alpha-olefin copolymer.

DETAILED DESCRIPTION OF THE INVENTION

The present invention relates to a stable hard surface microemulsion cleaning composition approximately by weight:

0.1% to 20% of at least one nonionic surfactant;

0.1% to 20% of at least one disinfecting agent such as a cationic surfactant, 0.1% to 20% of an amphoteric surfactant, 0.1% to 8% of at least one water soluble solvent;

0.1% to 3.0%, more preferably 0.2% to 2% of a water insoluble organic compound, essential oil, or a perfume, and the balance being water, wherein the composition is not a liquid crystal and the composition at 25° C. has a storage modulus of less than 0.2 Pascals at a frequency of 10 radians per second and a strain or 0.01% and the composition does not contain an anionic surfactant containing sulfonate, sulfate or carboxylate groups and the composition also does not contain a pyrrolidone compound such as N-methyl pyrrolidone and the composition also does not contain a grease release agent such as an ethoxylated maleic anhydride-alpha-olefin copolymer.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc.

The water insoluble organic compound, essential oil or perfume is present in the composition in an amount of from 0.1% to 3% by weight, preferably from 0.2% to 2% by weight.

Furthermore, although superior grease removal performance will be achieved for perfume compositions not containing any terpene solvents, it is apparently difficult for perfumers to formulate sufficiently inexpensive perfume compositions for products of this type (i.e., very cost sensitive consumer-type products) which includes less than 20%, usually less than 30%, of such terpene solvents.

The water insoluble saturated or unsaturated organic compound is selected from the group consisting of water insoluble hydrocarbons containing a cycloalkyl group having 5 to 10 carbon atoms, wherein the alkyl or cycloalkyl group can be saturated or unsaturated and the cycloalkyl group can have one or more saturated or unsaturated alkyl groups having 1 to 20 carbon atoms affixed to the alkyl or cycloalkyl group and one or more halogens, alcohols, nitro or ester group substituted on the cycloalkyl group or alkyl group; aromatic hydrocarbons; water insoluble ethers; water insoluble carboxylic acids, water insoluble alcohols, water insoluble amines, water insoluble esters, nitropropane, 2,5dimethylhydrofuran, 2-ethyl2-methyl 1,3dioxolane, 3-ethyl 4-propyl tetrahydropyran, N-isopropyl morpholine, alpha-methyl benzyldimethylamine, methyl chloroform and methyl perchloropropane, and mixtures thereof. Typical hydrocarbons are cyclohexyl-1decane, methyl-3 cyclohexyl-9 nonane, methyl-3 cyclohexyl-6 nononane, dimethyl cycloheplane, trimethyl cyclopentane, ethyl-2 isopropyl-4 cyclohexane. Typical aromatic hydrocarbons are bromotoluene, diethyl benzene, cyclohexyl bromoxylene, ethyl-3 pentyl-4 toluene, tetrahydronaphthalene, nitrobenzene, and methyl naphthalene. Typical water insoluble esters are benzyl acetate, dicyclopentadienylacetate, isononyl acetate, isobornyl acetate and isobutyl isobutyrate. Typical water insoluble ethers are di(alphamethyl benzyl) ether, and diphenyl ether. A typical alcohol is phenoxyethanol. A typical water insoluble nitro derivative is nitro propane.

Suitable essential oils are selected from the group consisting of: Anethole 20/21 natural, Aniseed oil china star, Aniseed oil globe brand,, Balsam (Peru), Basil oil (India), Black pepper oil, Black pepper oleoresin 40/20, Bois de Rose (Brazil) FOB, Borneol Flakes (China), Camphor oil, White, Camphor powder synthetic technical, Cananga oil (Java), Cardamom oil, Cassia oil (China), Cedarwood oil (China) BP, Cinnamon bark oil, Cinnamon leaf oil, Citronella oil, Clove bud oil, Clove leaf, Coriander (Russia), Coumarin 69° C. (China), Cyclamen Aldehyde, Diphenyl oxide, Ethyl vanilin, Eucalyptol, Eucalyptus oil, Eucalyptus citriodora, Fennel oil, Geranium oil, Ginger oil, Ginger oleoresin (India), White grapefruit oil, Guaiacwood oil, Gurjun balsam, Heliotropin, Isobornyl acetate, Isolongifolene, Juniper berry oil, L-methyl acetate, Lavender oil, Lemon oil, Lemongrass oil, Lime oil distilled, Litsea Cubeba oil, Longifolene, Menthol crystals, Methyl cedryl ketone, Methyl chavicol, Methyl salicylate, Musk ambrette, Musk ketone, Musk xylol, Nutmeg oil, Orange oil, Patchouli oil, Peppermint oil, Phenyl ethyl alcohol, Pimento berry oil, Pimento leaf oil, Rosalin, Sandalwood oil, Sandenol, Sage oil, Clary sage, Sassafras oil, Spearmint oil, Spike lavender, Tagetes, Tea tree oil, Vanilin, Vetyver oil (Java), Wintergreen, Allocimene, Arbanex™, Arbanol®, Bergamot oils, Camphene, Alpha-Campholenic aldehyde, I-Carvone, Cineoles, Citral, Citronellol Terpenes, Alpha-Citronellol, Citronellyl Acetate, Citronellyl Nitrile, Para-Cymene, Dihydroanethole, Dihydrocarveol, d-Dihydrocarvone, Dihydrolinalool, Dihydromyrcene, Dihydromyrcenol, Dihydromyrcenyl Acetate, Dihydroterpineol, Dimethyloctanal, Dimethyloctanol, Dimethyloctanyl Acetate, Estragole, Ethyl-2 Methylbutyrate, Fenchol, Fernol™, Florilys™, Geraniol, Geranyl Acetate, Geranyl Nitrile, Glidmint™ Mint oils, Glidox™, Grapefruit oils, trans-2-Hexenal, trans-2-Hexenol, cis-3-Hexenyl Isovalerate, cis-3-Hexanyl-2-methylbutyrate, Hexyl Isovalerate, Hexyl-2-methylbutyrate, Hydroxycitronellal, Ionone, Isobornyl Methylether, Linalool, Linalool Oxide, Linalyl Acetate, Menthane Hydroperoxide, I-Methyl Acetate, Methyl Hexyl Ether, Methyl-2-methylbutyrate, 2-Methylbutyl Isovalerate, Myrcene, Nerol, Neryl Acetate, 3-Octanol, 3-Octyl Acetate, Phenyl Ethyl-2-methylbutyrate, Petitgrain oil, cis-Pinane, Pinane Hydroperoxide, Pinanol, Pine Ester, Pine Needle oils, Pine oil, alpha-Pinene, beta-Pinene, alpha-Pinene Oxide, Plinol, Plinyl Acetate, Pseudo lonone, Rhodinol, Rhodinyl Acetate, Spice oils, alpha-Terpinene, gamma-Terpinene, Terpinene-4-OL, Terpineol, Terpinolene, Terpinyl Acetate, Tetrahydrolinalool, Tetrahydrolinalyl Acetate, Tetrahydromyrcenol, Tetralol®, Tomato oils, Vitalizair, Zestoral™, HINOKITIOL™ and THUJOPSIS DOLABRATA™.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15 carbon atoms, such as $C_9$–$C_{11}$ alkanol condensed with 2.5 TO 10 moles of ethylene oxide (NEODOL 91-2.5 OR -5 OR -6 OR -8), $C_{12-13}$ alkanol condensed with 6.5 moles ethylene oxide (Neodol 23-6.5), $C_{12-15}$ alkanol condensed with 12 moles ethylene oxide (Neodol 25-12), $C_{14-15}$ alkanol condensed with 13 moles ethylene oxide (Neodol 45-13), and the like.

An especially preferred nonionic system comprises the mixture of a nonionic surfactant formed from a $C_9$–$C_{11}$ alkanol condensed with 2 to 3.5 moles of ethylene oxide ($C_9$–$_{11}$ alcohol EO 2 to 3.5:1) with a nonionic surfactant formed from a $C_9$–$C_{11}$ alkanol condensed with 7 to 9 moles of ethylene oxide ($C_9$–$C_{11}$ alcohol EO 7 to 9:1), wherein the weight ratio of the $C_9$–$C_{11}$ alcohol EO 7 to 9:1 to the $C_9$–$C_{11}$ alcohol EO 2 to 3.5:1 is from 4:1 to 1:1 from preferably 3.5:1 to 2:1.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic detergents include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl phenol condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Also among the satisfactory nonionic detergents are the water-soluble condensation products of a $C_8$–$C_{20}$ alkanol with a heteric mixture of ethylene oxide and propylene oxide wherein the weight ratio of ethylene oxide to propylene oxide is from 2.5:1 to 4:1, preferably 2.8:1 to 3.3:1, with the total of the ethylene oxide and propylene oxide (including the terminal ethanol or propanol group) being from 60–85%, preferably 70–80%, by weight. Such detergents are commercially available from BASF-Wyandotte and a particularly preferred detergent is a $C_{10}$–$C_{16}$ alkanol condensate with ethylene oxide and propylene oxide, the weight ratio of ethylene oxide to propylene oxide being 3:1 and the total alkoxy content being about 75% by weight.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described composition. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Other suitable water-soluble nonionic detergents are marketed under the trade name "Pluronics". The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L 62 and L 64.

The major class of compounds found to provide highly suitable water soluble solvent for the composition are water-soluble polyethylene glycols having a molecular weight of 150 to 1000, polypropylene glycol of the formula $HO(CH_3CHCH_2O)_nH$ wherein n is a number from 2 to 18, mixtures of polyethylene glycol and polypropyl glycol (Synalox) and mono and di $C_1$–$C_6$ alkyl ethers and esters of ethylene glycol and propylene glycol having the structural formulas $R(X)_nOH$ $R_1(X)_nOH$ $R(X)_nOR$ and $R_1(X)_nOR_1$ wherein R is $C_1$–$C_6$ alkyl group, $R_1$ is $C_2$–$C_4$ acyl group, X is $(OCH_2CH_2)$ or $(OCH_2(CH_3)CH)$ and n is a number from 1 to 4, diethylene glycol, triethylene glycol, an alkyl lactate, wherein the alkyl group has 1 to 6 carbon atoms, 1 methoxy-2-propanol, 1methoxy-3-propanol, and 1methoxy 2-, 3- or 4-butanol.

Representative members of the polypropylene glycol include dipropylene glycol and polypropylene glycol having a molecular weight of 150 to 1000, e.g., polypropylene glycol 400. Other satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol monoacetate and dipropylene glycol propionate. These glycol type water soluble solvents are at a concentration of about 0.1 to about 8 weight %, more preferably about 0.3% to about weight 6%.

While all of the aforementioned glycol ether compounds provide the described stability, the most preferred cosurfactant compounds of each type, on the basis of stability performance and cosmetic appearance (particularly odor), is a combination of propylene glycol monobutyl ether and diethylene glycol monobutyl ether, wherein the weight ratio of the propylene glycol n-butyl ether to the diethylene glycol n-butyl ether is 4:1 to 2:1, more preferably 3:1.

Additional water soluble solvent useful in the instant compositions are $C_1$–$C_3$ alcohols such as methanol, ethanol and isopropanol which can be used in blend with above mentioned glycol ethers blends weight ratios of glycol ethers and alcohol are 1:5 to 5:1, more preferably 1:1.

Generally, amounts of water soluble solvents in the range of from 0.1 wt. % to 8 wt. %, preferably from about 0.3 wt. % to 6 wt. % provide stable compositions for the above-described levels of primary surfactants and water insoluble hydrocarbon, perfume or essential and any other additional ingredients as described below.

The instant compositions contain about 0.1 to about 2.0 wt. %, more preferably 0.25 to 8 wt. % of a disinfectant agent selected from the group consisting of $C_8$–$C_{16}$ alkyl amines, $C_8$–$C_{16}$ alkyl benzyl dimethyl ammonium chlorides, $C_8$–$C_{16}$ dialkyl dimethyl ammonium chlories, $C_8$–$C_{16}$ alkyl, $C_8$–$C_{14}$ alkyl dimethyl ammonium chloride and chlorhexidine and mixtures thereof.

Some typical disinfectant agent useful in the instant compositions are manufactured by Lonza, S. A. They are: Bardac 2180 (or 2170) which is N-decyl-N-isonoxyl-N, N-dimethyl ammonium chloride; Bardac 22 which is didecyl dimethyl ammonium chloride; Bardac LF which is N,Ndioctyl-N, N-dimethyl ammonium chloride; Bardac 114 which is a mixture in a ratio of 1:1:1 of N-alkyl-N, N-didecyl-N, N-dimethyl ammonium chloride/N-alkyl-N, N-dimethyl-N-ethyl ammonium chloride; and Barquat MB-50 which is N-alkyl-N, N-dimethyl-N-benzyl ammonium chloride.

The amine oxides which can be optionally used at a concentration of 0 to 10 wt. %, more preferably 0.1 wt. % to 8 wt. % in the instant formula are depicted by the formula:

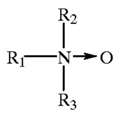

wherein $R_1$ IS A $C_{10}$–$C_{18}$ linear or branched chain alkyl group, $R_2$ is a $C_1$–$C_{16}$ linear alkyl group and $R_3$ is a $C_1$–$C_{16}$ linear alkyl group. Amine oxides can significantly decrease the residues left on surfaces. A preferred amine oxide, in addition to decyl-lauryl di-methyl amine oxide (Barlox 12i & 10s ex lonza) is a C10 alkyl di-ethyl amine oxide (AO-14-2) from TOMAH.

The instant composition can also optionally contain 0 to 10%, more preferably 0.1 to 8%, by weight of an amphoteric surfactant. They can be a water-soluble betaine having the general formula:

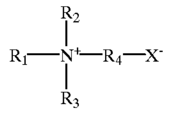

wherein $x^-$ is selected from the group consisting of $CO_2$— and $SO_3$— and $R_1$ is an alkyl group having 10 to about 20 carbon atoms, preferably 12 to 16 carbon atoms, or an amido radical:

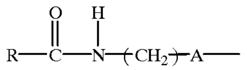

wherein R is an alkyl group having about 9 to 19 carbon atoms and a is the integer 1 to 4; $R_2$ and $R_3$ are each alkyl groups having 1 to 3 carbon atoms and preferably 1 carbon; $R_4$ is an alkylene or hydroxyalkylene group having from 1 to 4 carbon atoms and, optionally, one hydroxyl group. Typical alkyldimethyl betaines include decyl dimethyl betaine or 2-(N-decyl-N, N-dimethyl-ammonia) acetate, coco dimethyl betaine or 2-(N-coco N, N-dimethylammonia) acetate, myristyl dimethyl betaine, plamityl dimethyl betaine, lauryl dimethyl betaine, cetyl dimethyl betaine, stearyl dimethyl betaine, etc. The amido betaines similarly include cocoamidoethylbetaine, cocoamidopropyl betaine and the like. A preferred betaine is coco ($C_8$–$C_{18}$) amidopropyl dimethyl betaine. Two preferred betaine surfactants are Rewoteric AMB 13 and Golmschmidt betaine L7.

Another more preferred amphoteric material is an alkylaminocarboxylate group such as the glycine,N-(3 amino propyl)-C10-16 alkyl derivatives from Rhone Poulenc (their amphionic SFB). The amphoteric surfactants used at levels from 1 wt. % to 20 wt. % preferably at 1 wt. % to 10 wt. %, at pH of 7 to 10, preferably at a pH of 8 to 9 combines excellent degreasing efficacy in combination with nonionic and in presence of cationic, and also bring additional biocide activity to the composition.

The pH of the composition will be adjusted to pH 6 to 10 with NaOH, KOH, . . . but preferable with an organic alkalinity donor which will decrease the risk of streak formation such as an alkanolamine (diethanolamine or triethanolamine).

Buffering ingredients (preferably of the organic type) could also be part of the composition, such as benzoic or acetic acids (or blend of) neutralized with either NaOH, KOH or an alkanolamine base.

The final essential ingredient in the inventive compositions having improved interfacial tension properties is water. The proportion of water in the compositions generally is in the range of 20% to 97%, preferably 70% to 97% by weight.

In addition to the above-described essential ingredients, the compositions of this invention may often and preferably do contain one or more additional ingredients which serve to improve overall product performance.

The multi purpose liquid cleaning composition of this invention may, if desired, also contain other components either to provide additional effect or to make the product more attractive to the consumer. The following are mentioned by way of example: Colors or dyes in amounts up to 0.5% by weight, 2,6-di-tert.butyl-p-cresol, etc., in amounts up to 2% by weight; and pH adjusting agents, such as sulfuric acid or sodium hydroxide, as needed. Furthermore, if opaque compositions are desired, up to 4% by weight of an opacifier may be added.

In their final form, the multi purpose liquids are clear compositions and exhibit stability at reduced and increased temperatures. More specifically, such compositions remain clear and stable in the range of 5° C. to 50° C., especially 10° C. to 43° C. and the compositions exhibit a pH in the neutral to the alkaline range.

The compositions are directly ready for use as desired and only minimal rinsing is required and substantially no residue or streaks are left behind. Furthermore, because the compositions are free of detergent builders such as alkali metal polyphosphates they are environmentally acceptable and provide a better "shine" on cleaned hard surfaces.

When intended for use in the neat form, the liquid compositions can be packaged under pressure in an aerosol container or in a pump-type sprayer for the so-called spray-and-wipe type of application. The composition can also be dispensed from a non woven or fabric towel which can be used once and discarded or reused several times with adequate rinsing between usage.

Because the compositions as prepared are aqueous liquid formulations, the compositions are easily prepared simply by combining all the ingredients in a suitable vessel or container. The order of mixing the ingredients is not particularly important and generally the various ingredients can be added sequentially or all at once or in the form of aqueous solutions of each or all of the primary detergents and cosurfactants can be separately prepared and combined with each other and with the perfume. It is not necessary to use elevated temperatures in the formation step and room temperature is sufficient.

The instant formulas explicitly exclude alkali metal silicates and alkali metal builders such as alkali metal polyphosphates, alkali metal carbonates, alkali metal phosphonates and alkali metal citrates because these materials, if used in the instant composition, would cause the composition to have a high pH as well as leaving residue on the surface being cleaned.

The following examples illustrate liquid cleaning compositions of the described invention. The exemplified compositions are illustrative only and do not limit the scope of the invention. Unless otherwise specified, the proportions in the examples and elsewhere in the specification are by weight.

EXAMPLE 1

The following compositions in wt. % were prepared by simple mixing procedure:

| | 1 | 2 | 3 | 4 | 5 | 6 | 7 | 8 |
|---|---|---|---|---|---|---|---|---|
| Neodol 91-5 | 1.55 | 1.55 | 1.55 | 2 | 1.55 | 1.55 | | |
| Neodol 91-6 | | | | | | | 1.55 | 1.55 |
| Bardac 2170 | | 0.5 | | | 1.4 | | | 0.5 |
| Bardac 22 | | | | | | 0.5 | 0.5 | |
| Amphionic SFB | 0.9 | 0.9 | 1.4 | 0.9 | | 0.9 | 0.9 | 0.9 |
| Propylene glycol n-butyl ether | 4 | 4 | 4 | 4 | 4 | 3 | 4 | 4 |
| Perfume | 0.35 | 0.35 | 0.35 | 0.35 | 0.35 | 0.35 | 0.35 | 0.35 |
| Water | Bal. | Bal. | Bal. | Bal. | Bal. | Bal. | Bal. | Bal. |
| pH | 8.9 | 8.5 | 8.5 | 8.5 | 8.5 | 8.5 | 8.5 | 8.5 |
| Disinfecting results neat EN1040 | >5log | >5log | — | — | — | — | — | — |
| EN 1276 | — | — | | | | | | |
| AFNOR 72190 | — | — | | | | | | |
| % degreasing test neat vs reference[1] | 71 | 91 | 95 | 82 | 65.3 | 83 | 87.5 | 86.9 |
| Residue vs reference[2] | 49 | 69 | 51 | 60 | 88 | 56 | 50 | 80 |
| oil uptake oil level/surfactant level | 0.5 | 1.46 | — | — | — | — | — | — |

| | 9 | 10 | 11 | 12 | 13 | 14 | 15 | 16 | 17 |
|---|---|---|---|---|---|---|---|---|---|
| Neodol 91-5 | 1.55 | 1.55 | | | 1.55 | 1.55 | 1.55 | 1.55 | 1.55 |
| Bardac 2170 | 0.25 | 0.5 | 0.5 | 0.5 | 0.5 | 0.5 | 0.5 | 0.5 | 0.5 |
| Bardac 22 | 0.25 | | | | | | | | |
| Basf Plurafac | | | 1.4 | 1.5 | | | | | |
| Ao 14-2 | | | 0.85 | | | | | | |
| Barlox 12i | | | | 0.84 | | | | | |
| Amphionic SFB | 0.9 | 0.9 | | | | | | 0.225 | |
| Cocoamido propyl betaine | | | | | 0.9 | | 0.9 | 0.675 | 0.9 |
| Lauryl alkyl dimethyl betaine | | | | | | 0.9 | | | |
| Propylene glycol n-butyl ether | 4 | 2 | 2 | 2 | 4 | 4 | 4 | 4 | 4 |
| Ethanol | | | | | | | | | 1 |
| Triethanol amine | | | | | | | 0.13 | | 0.13 |
| Perfume | 0.35 | 0.35 | 0.35 | 0.35 | 0.35 | 0.35 | 0.35 | 0.35 | |
| Water | Bal. | Bal. | Bal. | Bal. | Bal. | Bal. | Bal. | Bal. | Bal. |
| Ph | 8.5 | 8.5 | 8.5 | 8.5 | 5.5 | 5.3 | 8.5 | 7.2 | 7.2 |
| Disinfecting results neat EN1040 | — | — | — | — | >5log | — | >5log | >5log | |
| EN 1276 | | | | | — | | TBD | — | |
| AFNOR 72190 | | | | | — | | TBD | — | |

-continued

| | | | | | | | | |
|---|---|---|---|---|---|---|---|---|
| % degreasing test neat vs reference | 80.8 | 62 | 58 | 53.6 | 82 | 85 | 95 | 90 |
| Residue vs reference | 76 | 70 | 62 | 55 | 59 | — | 91 | 72 |
| oil uptake oil level/surfactant level | — | — | — | — | 2.31 | — | 2.78 | 2.59 |

1. The higher the value, the best the result (a value of 100 meaning excellent grease removal versus anionic/nonionic based spray reference).

2 The higher the value, the best the result (a value of 100 meaning no/low.

The test protocol used to assess disinfection is the well known French AFNOR Norm 72-151 or EN 1040-1276 which uses four different strains of bacteria, a short contact time and calls for a bacteria count reduction of 5 log.

EXAMPLE 2

The following composition in wt. % was prepared:

| | |
|---|---|
| Propylene glycol n-butyl ether | 2.4 |
| Anhydrous ethyl alcohol | 0.8 |
| Diethylene glycol monobutyl ether | 0.8 |
| Cocamidopropyl betaine No. 3 | 2.4 |
| 50% benzalkonium chloride solution | 0.8 |
| C9-11 alcohol EO 5:1 | 0.77 |
| C9-11 alcohol EO 7.5–8:1 | 0.47 |
| 99% triethanolamine | 0.1 |
| Perfume | 0.28 |
| Water | Bal. |
| pH | |
| Disinfecting results neat EN1040 | |
| EN 1270 | |
| AFNOR 72190 | |
| % degreasing test neat vs reference[3] | |

EXAMPLE 3

The following composition in wt. % was prepared:

| | |
|---|---|
| Propylene glycol n-butyl ether | 3.0 |
| Anhydrous ethyl alcohol | 1.0 |
| Diethylene glycol monobutyl ether | 1.0 |
| Cocamidopropyl betaine | 3.0 |
| Bardac 2170P (Lonza) | 0.72 |
| C9-11 alcohol EO 2.5:1 | 0.37 |
| C9-11 alcohol EO 7.5–8:1 | 1.18 |
| 99% triethanolamine | 0.1 |
| Perfume | 0.3 |
| Water | Bal. |
| pH | |
| Disinfecting results neat EN1040 | |
| EN1270 | |
| AFNOR 72190 | |
| % degreasing test neat vs reference[4] | |

In summary, the described invention broadly relates to an improved microemulsion composition containing a cationic surfactant, a nonionic surfactant and an amphoteric surfactant, a water soluble solvent, a hydrocarbon ingredient and water.

What is claimed:

1. A microemulsion composition comprising approximately by weight:

(a) 0.1% to 20% of at least one disinfecting agent;

(b) 0.1 wt. % to 20 wt. % of at least one ethoxylated nonionic surfactant;

(c) 0.1% to 20% of an amphoteric surfactant;

(d) 0.1% to 8% of at least one water soluble solvent;

(e) 0.1% to 3% of a water insoluble organic hydrocarbon, essential oil or a perfume; and (f) the balance being water, wherein the composition is not a liquid crystal and the composition has a storage modulus at 25 C. less than 0.2 Pascal when measured at a frequency of ten radian per second and a strain of 0.01% and the composition does not contain an anionic surfactant containing sulfonate, sulfate or carboxylate groups and the composition also does not contain a pyrrolidone compound such as and the composition also does not contain a grease release agent.

2. The composition according to claim 1, wherein the disinfecting agent is selected from the group consisting of $C_8$–$C_{16}$ alkyl amines, $C_8$–$C_{16}$ alkyl benzyl dimethyl ammonium chlorides, $C_8$–$C_{16}$ dialkyl dimethyl ammonium chlorides, $C_8$–$C_{16}$ alkyl, $C_8$–$C_{14}$ alkyl dimethyl ammonium chloride, benzalkonium chloride and chlorhexidine and mixtures thereof.

3. The composition according to claim 2, wherein said water soluble solvent is a mixture of propylene glycol n-butyl ether and diethylene glycol n-butyl ether.

4. The composition according to claim 3, further including a $C_1$–$C_3$ alcohol.

5. The composition according to claim 1, further including propylene glycol n-butyl ether.

6. The composition according to claim 1, further including an amine oxide characterized by the formula:

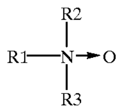

wherein $R_1$ is a $C_{10}$–$C_{18}$ linear or branched chain alkyl group, $R_2$ is a $C_1$–$C_{16}$ linear alkyl group and $R_3$ is a $C_1$–$C_{16}$ linear alkyl group.

7. The composition according to claim 1, wherein the nonionic surfactant is a combination of a $C_9$–$C_{11}$ alcohol EO 2 to 3.5:1 and a $C_9$–$C_{11}$ alcohol EO 7 to 9:1.

8. The composition according to claim 1 further including triethanol amine and sodium benzoate and the composition has a pH of 6 to 9.

* * * * *